(12) United States Patent
Lee et al.

(10) Patent No.: US 9,104,052 B2
(45) Date of Patent: Aug. 11, 2015

(54) LIQUID CRYSTAL DISPLAY DEVICE

(75) Inventors: YoungNam Lee, Paju-si (KR);
JunYoung Jo, Paju-si (KR); YoungOk Kim, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 75 days.

(21) Appl. No.: 13/442,617

(22) Filed: Apr. 9, 2012

(65) Prior Publication Data
US 2012/0268686 A1  Oct. 25, 2012

(30) Foreign Application Priority Data
Apr. 21, 2011  (KR) .................. 10-2011-0037359

(51) Int. Cl.
*G02F 1/1333*  (2006.01)
*G02F 1/1345*  (2006.01)

(52) U.S. Cl.
CPC ...... *G02F 1/133308* (2013.01); *G02F 1/13452* (2013.01); *G02F 2001/133317* (2013.01); *G02F 2001/133334* (2013.01); *G02F 2202/22* (2013.01); *G02F 2202/28* (2013.01)

(58) Field of Classification Search
CPC .............. G02F 2001/133334; G02F 1/136204; G02F 2202/22
USPC ...................... 349/58, 59, 150, 152
See application file for complete search history.

(56) References Cited

U.S. PATENT DOCUMENTS

| 6,388,722 | B1 * | 5/2002 | Yoshii et al. ............. | 349/58 |
| 6,490,016 | B1 * | 12/2002 | Koura .............. | 349/58 |
| 6,801,195 | B2 * | 10/2004 | Yoshida ............ | 345/204 |
| 6,971,780 | B2 * | 12/2005 | Lee et al. ............ | 362/561 |
| 7,030,546 | B2 * | 4/2006 | Han et al. ............ | 313/402 |
| 7,184,117 | B2 * | 2/2007 | Suzuki ............ | 349/150 |
| 7,385,664 | B2 * | 6/2008 | Lee et al. ............ | 349/149 |
| 8,064,002 | B2 * | 11/2011 | Kim et al. ............ | 349/40 |
| 8,415,569 | B2 * | 4/2013 | Chan et al. ............ | 174/544 |
| 8,456,584 | B2 * | 6/2013 | Koo ............ | 349/58 |
| 2004/0027526 | A1 * | 2/2004 | Pai ............ | 349/149 |
| 2009/0011197 | A1 | 1/2009 | Matsuhira | |
| 2009/0079894 | A1 * | 3/2009 | Okuda ............ | 349/58 |

FOREIGN PATENT DOCUMENTS

CN  101201485 A  6/2008

* cited by examiner

*Primary Examiner* — Jessica M Merlin
*Assistant Examiner* — Mark Teets
(74) *Attorney, Agent, or Firm* — Fenwick & West LLP

(57) ABSTRACT

Discussed is an LCD device. The LCD device includes a guide panel, a side cover, a flexible film, and an adhesive member. The guide panel includes a side wall and a support part formed to surround a lower edge of a liquid crystal panel, and supports the liquid crystal panel. The side cover is formed to surround a side surface of the liquid crystal panel and a side surface of the guide panel, and a hole is formed at a portion of the liquid crystal panel having a certain height. The flexible film is disposed between the support part of the guide panel and the liquid crystal panel. The adhesive member adheres a bottom of the liquid crystal panel to the flexible film.

6 Claims, 3 Drawing Sheets

LIQUID CRYSTAL DISPLAY DEVICE

CROSS-REFERENCE TO RELATED APPLICATIONS

This application claims the priority benefit of the Korean Patent Application No. 10-2011-0037359 filed on Apr. 21, 2011, which is hereby incorporated by reference as if fully set forth herein.

BACKGROUND

1. Field of the Invention

The present invention relates to a display device, and more particularly, to a Liquid Crystal Display (LCD) device which prevents light leakage and thus has the enhanced display quality and the enhanced ability to remove static electricity.

2. Discussion of the Related Art

Various flat panel display devices that can decrease a weight and a volume corresponding to the limitations of Cathode Ray Tubes (CRTs) are being developed, and the demand of the flat panel display devices is increasing.

Liquid Crystal Display (LCD) devices, Plasma Display Panels (PDPs), Field Emission Display (FED) devices, and Light Emitting Diode (LED) display devices have been developed as flat panel display devices.

In such flat panel display devices, the application fields of LCD devices are being expanded because the LCD devices are easily manufactured and have drivability of drivers, low power consumption, thin thickness, high image quality, and a large screen.

In LCD devices of the related art, since an area for sustaining the weight of a liquid crystal panel is required, there is a limitation in reducing the bezel area. Therefore, a case top covers the outer portion of a screen, and thus, the satisfaction of an external design is reduced.

Recently, the research and development of flat panel display devices are increasingly required for designs interesting to consumers, with the technical development of the flat panel display devices.

Therefore, efforts are being continuously made for slimming the thickness of display devices. Furthermore, a narrow bezel type LCD device that decreases the area of an outer border portion is being developed for satisfying consumers' requirement on a design. Also, a borderless LCD device having no outer border portion is being developed.

FIG. 1 is a view schematically illustrating a related art borderless LCD device.

Referring to FIG. 1, the related art borderless LCD device includes a cover bottom 10, a light guide panel 20, a plurality of optical sheets 30, a liquid crystal panel 40, a guide panel 50, a set back cover 60, a side cover 70, and a driving circuit part (not shown).

An upper polarizer 42 is disposed at an upper portion of the liquid crystal panel 40, and a lower polarizer 44 is disposed at a lower portion of the liquid crystal panel 40.

In the related art borderless LCD device including the above-described elements, a front surface of the liquid crystal panel 40 is opened by removing a case top, and the liquid crystal panel 40 is adhered to the guide panel 50. In this case, the liquid crystal panel 40 is fixed to the guide panel 50 with an adhesive tape 52 having a double-sided adhesive strength.

The liquid crystal panel 40 is adhered and fixed to an instrument material such as the guide panel 50, for removing a border, but light leakage occurs when an impulse is applied to the liquid crystal panel 40 that is fixed to the guide panel 50 by the adhesive tape 52. Also, since the liquid crystal panel 40 is strongly fixed to the guide panel 50 by the adhesive tape 52, the movement margin of the liquid crystal panel 40 is low, and thus, the liquid crystal panel 40 is largely damaged when an external impulse is applied thereto.

Since the liquid crystal panel 40 and the guide panel 50 that are fixed by the adhesive tape 52 are different materials, the liquid crystal panel 40 and the guide panel 50 are differently expanded and contracted when a temperature is changed, and thus, the liquid crystal panel 40 is bent. Due to this reason, liquid crystal molecules are not smoothly aligned, causing light leakage.

Particularly, due to the removal of a border, the front surface of the liquid crystal panel 40 is exposed to the outside as-is, and thus, static electricity is easily generated. Also, since there is no path for discharging the static electricity, an error occurs in driving a screen.

SUMMARY

Accordingly, the present invention is directed to provide an LCD device that substantially obviates one or more problems due to limitations and disadvantages of the related art.

An aspect of the present invention is directed to provide an LCD device which can prevent the damage of a liquid crystal panel.

Another aspect of the present invention is directed to provide an LCD device which prevents the flexure of a liquid crystal panel and light leakage, leading to the increase in display quality.

Another aspect of the present invention is directed to provide a borderless LCD device which has the enhanced ability to remove static electricity.

Another aspect of the present invention is directed to provide a borderless LCD device which has the reduced thickness and the enhanced sense of beauty in a front surface.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a guide panel including a side wall and a support part formed to surround a lower edge of a liquid crystal panel, and supporting the liquid crystal panel; a side cover formed to surround a side surface of the liquid crystal panel and a side surface of the guide panel, a hole being formed at a portion of the liquid crystal panel having a certain height; a flexible film disposed between the support part of the guide panel and the liquid crystal panel; and an adhesive member adhering a bottom of the liquid crystal panel to the flexible film.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
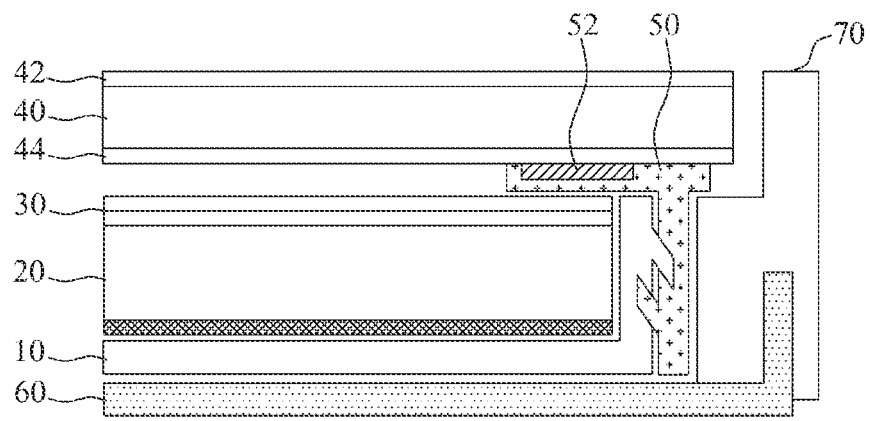
FIG. 1 is a view schematically illustrating a related art borderless LCD device.
Figure 2:
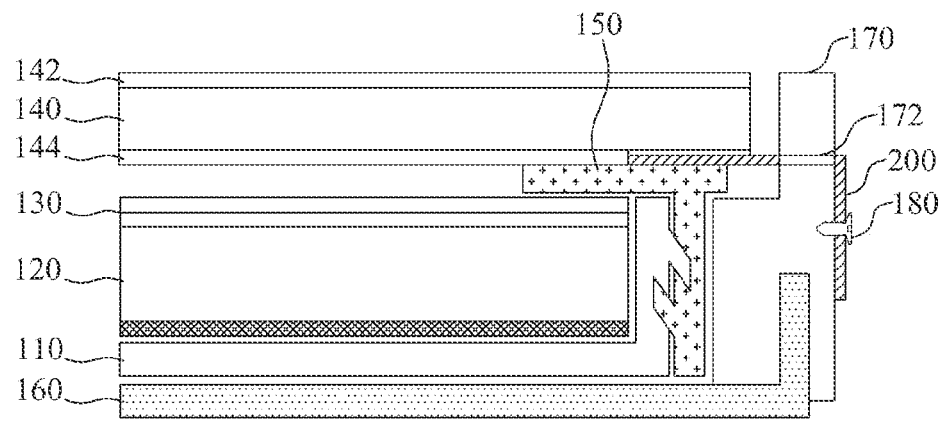
FIGS. 2 and 3 are views illustrating an LCD device according to a first embodiment of the present invention.
Figure 3:
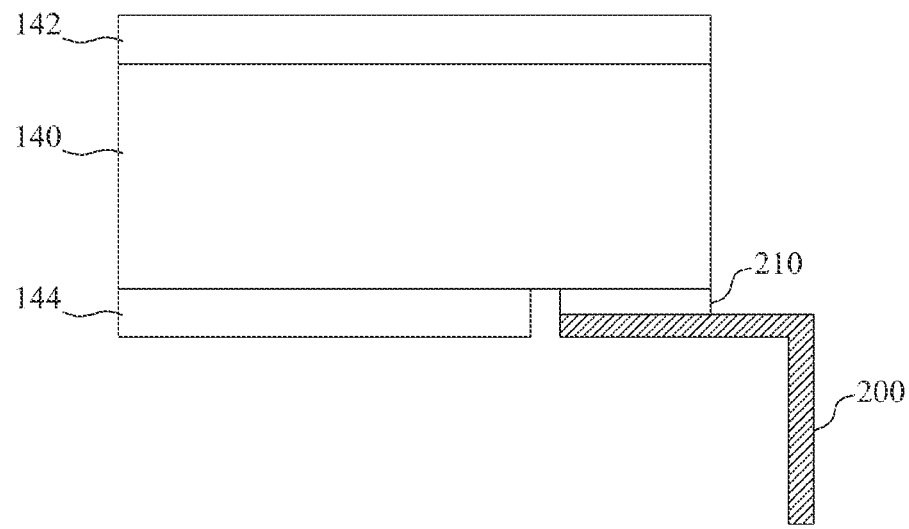

FIGS. 2 and 3 are views illustrating an LCD device according to a first embodiment of the present invention.

Referring to FIGS. 2 and 3, the LCD device according to the first embodiment of the present invention includes a cover bottom 110, a liquid crystal panel 140, a guide panel 150, a set back cover 160, a side cover 170, a conductive flexible film 200, and an adhesive member 210.

Moreover, the LCD device according to the first embodiment of the present invention includes a backlight unit, and a driving circuit part for driving the liquid crystal panel 140 and a light source.

The liquid crystal panel 140 includes an upper substrate (color filter array substrate) and a lower substrate (TFT array substrate) that are coupled about a liquid crystal for adjusting a light transmittance.

A plurality of gate lines and data lines are formed to intersect each other, at the lower substrate. A plurality of pixels are defined by the intersection of the gate lines and data lines. A Thin Film Transistor (TFT) (being a switching element) and a storage capacitor are formed in each of a plurality of pixels.

Red (R), Green (G), and Blue (B) color filters for outputting light (which is incident via a liquid crystal layer) as specific color light and a Black Matrix (BM) for preventing the mixing of color light are formed at the upper substrate.

The LCD device according to the first embodiment of the present invention filters light which is incident through the liquid crystal layer and thus outputs R, G, and B color light to the outside by using the color filters, thereby realizing a color image.

An upper polarizer 142 is disposed at an upper portion of the liquid crystal panel 140, and a lower polarizer 144 is disposed at a lower portion of the liquid crystal panel 140.

The lower polarizer 144 is adhered to a rear surface of the lower substrate in the liquid crystal panel 140, and polarizes light which is incident from the backlight unit to thereby irradiate the polarized light on the lower substrate. The upper polarizer 142 is adhered to a top of the lower substrate in the liquid crystal panel 140, and polarizes light which is incident through the upper substrate to thereby output the polarized light to the outside.

The driving circuit part includes a gate driver, a data driver, a timing controller, and a backlight driver.

Figure 4:
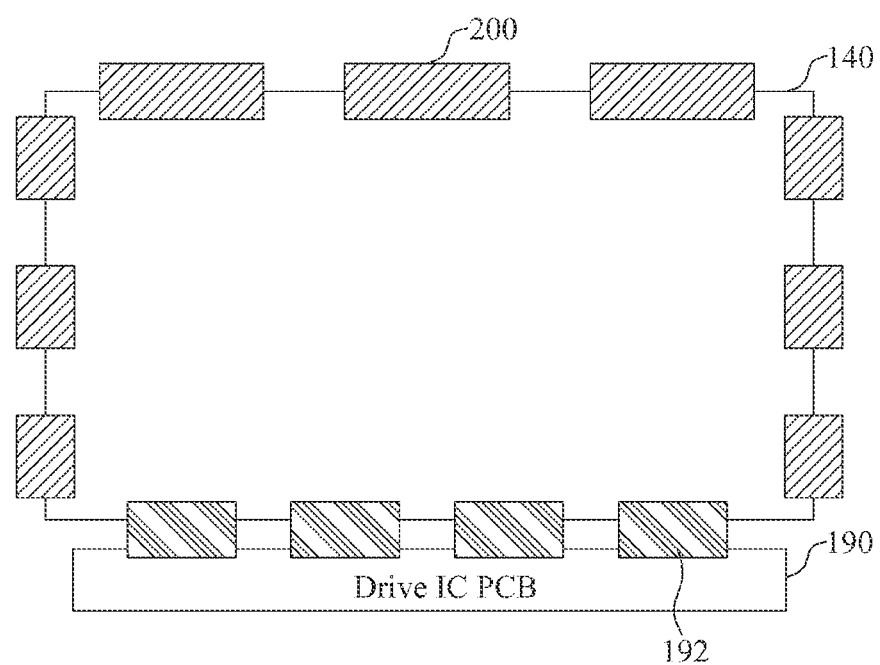
FIG. 4 is a view illustrating a shape where a flexible film is attached to a display panel.

As illustrated in FIG. 4, a driving circuit part 190 may be formed by mounting a plurality of drive Integrated Circuits (ICs) on a Printed Circuit Board (PCB). All or a portion of the driving circuit part 190 may be formed in a Chip On Glass (COG) type or Chip On Flexible Printed Circuit (Chip On Film, COF) type. The drive ICs of the driving circuit part 190 are connected to liquid crystal panel 140 through a Flexible Printed Circuit (FPC) 192.

The timing controller converts input video signals into digital image data (RGB) in units of a frame with a timing signal, and supplies the digital image data, which have been aligned in units of a frame, to the data driver.

Herein, the timing signal (TS) includes a vertical sync signal (Vsync), a horizontal sync signal (Hsync), and a clock signal (CLK).

Moreover, the timing controller generates a gate control signal (GCS) for controlling the gate driver and a data control signal (DCS) for controlling the data driver, with the timing signal (TS). The gate control signal (GCS) is supplied to the gate driver, and the data control signal (DCS) is supplied to the data driver.

The data control signal (DCS) may include a source start pulse (SSP), a source sampling clock (SSC), a source output enable (SOE), and a polarity control signal (POL).

The gate control signal (GCS) may include a gate start pulse (GSP), a gate shift clock (GSC), and a gate output enable (GOE).

The timing controller may generate a backlight control signal (BCS) for controlling a backlight on the basis of video data and the timing signal (TS), and supply the backlight control signal (BCS) to the backlight driver.

The gate driver includes a plurality of gate drive ICs, and generates a scan signal for driving the TFTs on the basis of the gate control signal (GCS) from the timing controller.

The scan signal is sequentially supplied to the gate lines that are formed at the liquid crystal panel 140, during one frame period. The TFTs, which are formed in the respective pixels, are switched on by the scan signal that is sequentially supplied to the gate lines.

The data driver includes a plurality of source drive ICs, and converts digital image data, supplied from the timing controller, into a plurality of data voltages (analog image data). Furthermore, the data driver supplies data voltages for one horizontal line to the data lines that are formed in the liquid crystal panel 140, with time when the TFTs of respective sub-pixels on one horizontal line are turned on.

Herewith, a common voltage (Vcom) is supplied to a common electrode that is formed in each pixel of the liquid crystal panel 140. An electric field is generated in each pixel with a data voltage and the common voltage that are supplied to each pixel. The light transmittance of each pixel may be controlled by aligning liquid crystal molecules with the electric field.

The backlight driver may control the driving (turn-on/off) of the backlight, and specifically control the on/off time, duty ratio, and luminance of the backlight on the basis of the backlight control signal (BCS) that is supplied from the timing controller. As an example, the backlight driver may generate a Pulse Width Modulation (PWM) signal for controlling the luminance of the backlight, and control the duty ratio and luminance of the backlight with the PWM signal.

The cover bottom 110 is formed in a tetragonal frame shape in which a certain space is prepared, and the backlight unit is disposed in the space. Also, the cover bottom 110 includes a side wall that is expanded from a bottom surface and formed. A disposing part for the guide panel 150 is formed at the side wall. Herein, the cover bottom 110 and the guide panel 150 are coupled to each other by an instrument material such as a hook.

The backlight unit includes: a light source (not shown) that generates light supplied to the liquid crystal panel 140; a light guide panel 120 that guides the light, supplied from the light source, to the liquid crystal panel 140; a plurality of optical sheets 130; and a reflector (not shown in FIG. 2).

One or more type light sources of various light sources such as Cold Cathode Fluorescent Lamps (CCFLs), External Electrode Fluorescent Lamps (EEFLs), and Light Emitting Diodes (LEDs) may be combined and applied to the backlight unit.

The light guide panel 120 is formed in a flat type to have a light incident surface that receives light and a body that changes the path of light. The light guide panel 120 changes the path of light that is incident from the light source, and irradiates the light onto the liquid crystal panel 140.

The reflector is disposed at a rear surface of the light guide panel 120, and reflects incident light to the liquid crystal panel 140.

The optical sheets 130 are for increasing the efficiency of light irradiated on the liquid crystal panel 140. In detail, the optical sheets 130 diffuse and collect light that is incident from the light guide panel 120, and supply the diffused and collected light to the liquid crystal panel 140. For this end, the optical sheets 130 may include a diffusion sheet, a prism sheet, and a reflective polarization film.

The guide panel 150 includes a side wall and a support part for supporting the liquid crystal panel 140. The support part of the guide panel 150 is disposed on a side wall of the cover bottom 110.

The support part of the guide panel 150 is formed to surround an edge portion of the liquid crystal panel 140. The side wall of the guide panel 150 is coupled and fixed to the side wall of the cover bottom 110.

The support part of the guide panel 150 protrudes horizontally from the side wall and supports an edge of the liquid crystal panel 140. Particularly, in order to reduce the thickness of the LCD device, the case top that is essentially included in the related art LCD device is not applied to the present invention.

A top of the liquid crystal panel 140 may be disposed higher or lower than a side wall of the side cover 170. In this case, the sense of beauty in a front surface of the LCD device can be reduced due to a step height between the liquid crystal panel 140 and the side cover 170. Therefore, the support part of the guide panel 150 is formed to have a certain height such that a step height is not formed between the liquid crystal panel 140 and the side cover 170.

Moreover, the support part of the guide panel 150 pressurizes the optical sheets 130 of the backlight unit, and thus can prevent the unnecessary movement of the optical sheets 130.

The side wall of the guide panel 150 is formed vertically from the support part in a tetragonal frame shape, and coupled and fixed to the side wall of the bottom cover 110.

The conductive flexible film 200 is disposed between the support part of the guide panel 150 and the liquid crystal panel 140. The conductive flexible film 200 guarantees the movement margin of the liquid crystal panel 140 and prevents the flexure of the liquid crystal panel 140.

The side cover 170 is formed to surround a side surface of the liquid crystal panel 140 and a side surface of the guide panel 150, and coupled to the set back cover 160. The side cover 170 guides the side surface of the liquid crystal panel 140 and the guide panel 150.

A hole 172 is formed at a portion of the side cover 170 having a certain height, and the conductive flexible film 200 passes through the hole 172.

The adhesive member 210 may be implemented as a double-sided adhesive tape, and a bottom of the adhesive member 210 is adhered to the conductive flexible film 200. Furthermore, a top of the adhesive member 210 is adhered to a rear surface of the liquid crystal panel 140.

The rear surface of the liquid crystal panel 140 is adhered to the conductive flexible film 200 by the adhesive member 210. The liquid crystal panel 140 is fixed onto the conductive flexible film 200 by the adhesive member 210. Herein, the adhesive member 210 includes a resin for adhesive and a conductive ball for an electrical connection.

The conductive ball is for discharging static electricity that is generated in the liquid crystal panel 140. Specifically, the conductive ball electrically connects static electricity, which is generated in the exposed portion of the liquid crystal panel 140, to the conductive flexible film 200 and thereby discharges the static electricity to outside the LCD device.

The conductive flexible film 200 is formed as a thin flexible film with conductivity (for example, a polyimide film or a polyethylene film). The conductive flexible film 200 is formed to have a thickness of 33 um to 41 um and a tensile strength of 4000 kgf/cm$^2$ to 5400 kgf/cm$^2$.

The conductive flexible film 200 includes a disposing part and a fixing part. The disposing part is disposed between the liquid crystal panel 140 and the guide panel 150. The fixing part is formed to contact a side wall of the side cover 170.

Herein, the disposing part of the conductive flexible film 200 is formed in parallel to the liquid crystal panel 140 and the guide panel 150, and the fixing part is bent vertically from the disposing part. That is, the fixing part is bent vertically from the disposing part, and thus, the conductive flexible film 200 has a "L"-shape. That is, the fixing part of the conductive flexible film 200 is bent such that an angle (e.g., approximately a right (90 degree) angle) is formed between the fixing part and the disposing part.

The disposing part of the conductive flexible film 200 is disposed to pass through the hole 172 that is formed in the side cover 170, and the fixing part of the conductive flexible film 200 is disposed to contact a side wall of the side cover 170. The fixing part is fixed to the side cover 170 by a screw 180.

An impulse can be applied to the liquid crystal panel 140 in a horizontal/vertical direction. Herein, the movement margin of the liquid crystal panel 140 is secured by the conductive flexible film 200 formed of a thin-film flexible material, thus preventing the damage of the liquid crystal panel 140.

Referring to FIG. 4, the conductive flexible film 200 may be patterned to have a certain size and adhered to three surfaces of four surfaces of the liquid crystal panel 140. The FPC 192 is disposed at one surface to which the conductive flexible film 200 is not adhered, and thus, the drive ICs of the driving circuit part 190 are connected to the liquid crystal panel 140.

In the LCD device according to an embodiment of the present invention, in a manufacturing process, the conductive flexible film 200 may be adhered to the liquid crystal panel 140 with equipment that adheres the FPC 192 to the drive ICs of the driving circuit part 190.

The liquid crystal panel 140 can be expanded and contracted according to the change in an ambient temperature, but since the conductive flexible film 200 is formed of a soft material, thus guaranteeing the movement of the liquid crystal panel 140 due to the temperature change. Therefore, the liquid crystal panel 140 can be prevented from being bent due to the change in an external environment, thus preventing light leakage due to the modification of the liquid crystal panel 140.

Moreover, since the liquid crystal panel 140 is exposed as-is by removing a border, the liquid crystal panel 140 is vulnerable to static electricity. Static electricity generated in the liquid crystal panel 140 can be discharged to outside the LCD device through the conductive flexible film 200 and the adhesive member 210 including the conductive ball. Accordingly, the driving error of the liquid crystal panel 140 due to static electricity can be prevented.

Figure 5:
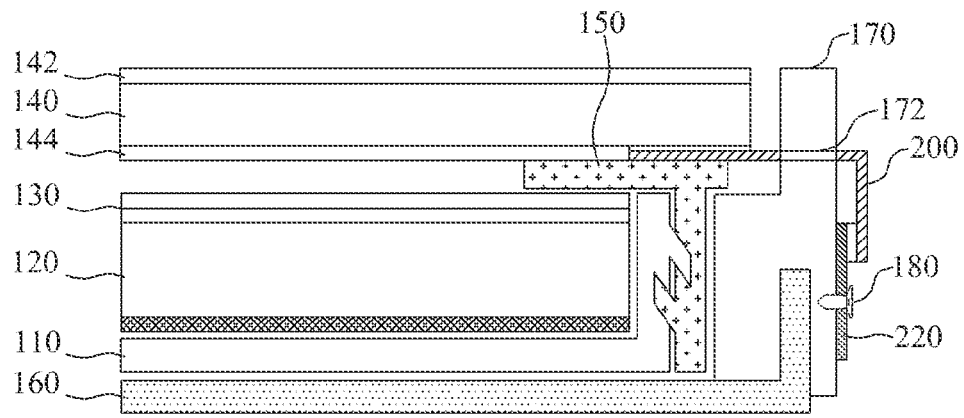
FIGS. 5 and 6 are views illustrating an LCD device according to a second embodiment of the present invention.
Figure 6:
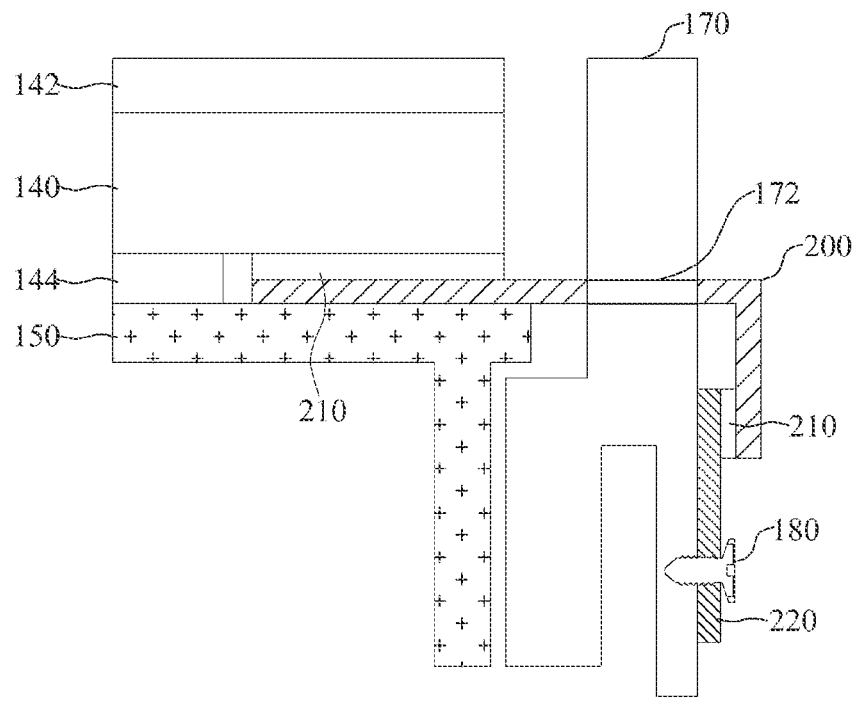

FIGS. 5 and 6 are views illustrating an LCD device according to a second embodiment of the present invention. In FIGS. 5 and 6, the same elements as those of the first embodiment are respectively indicated by the same reference numerals.

In describing the LCD device according to the second embodiment of the present invention with reference to FIGS. 5 and 6, descriptions on the same elements as those of the first embodiment are not provided.

Referring to FIGS. 5 and 6, the LCD device according to the second embodiment of the present invention includes a cover bottom 110, a liquid crystal panel 140, a guide panel 150, a set back cover 160, a side cover 170, a conductive flexible film 200, an adhesive member 210, and an electrostatic discharge (ESD) pad 220.

The guide panel 150 includes a side wall and a support part for supporting the liquid crystal panel 140. The support part is disposed on a side wall of the cover bottom 110.

The support part of the guide panel 150 is formed to surround an edge portion of the liquid crystal panel 140. The side wall of the guide panel 150 is coupled and fixed to the side wall of the cover bottom 110.

A conductive flexible film 200 is disposed on the support part of the guide panel 150, and adhered to a rear surface of the liquid crystal panel 140 by the adhesive member 210.

The conductive flexible film 200 includes a disposing part and a fixing part. The fixing part is bent vertically from the disposing part, and thus the conductive flexible film 200 has a "" shape. That is, the fixing part of the conductive film 200 is bent such that an angle (e.g., approximately a right (90 degree angle) is formed between the fixing part and the disposing part.

The conductive flexible film 200 is formed as a thin flexible film with conductivity (for example, a polyimide film or a polyethylene film). The conductive flexible film 200 is formed to have a thickness of 33 um to 41 um and a tensile strength of 4000 kgf/cm² to 5400 kgf/cm².

The side cover 170 is coupled to the set back cover 160, and thus guides the side surface of the liquid crystal panel 140 and the guide panel 150.

A hole 172 is formed at a portion of the side cover 170 having a certain height, and the disposing part of the conductive flexible film 200 passes through the hole 172. Accordingly, the fixing part of the conductive flexible film 200 is disposed at an outer side wall of the side cover 170.

The ESD pad 220 is formed at an outer side wall of the side cover 170, and fixed to the fixing part of the conductive flexible film 200 with the adhesive member 210. The ESD pad 220 is coupled and fixed to the outer side wall of the side cover 170 by a screw 180.

In this case, the adhesive member includes a conductive ball, and thus, static electricity generated in the liquid crystal panel 140 is discharged to the ESD pad 220 via the conductive flexible film 200.

According to the above-described configuration, the liquid crystal panel 140 is supported by the support part of the guide panel 150, and fixed by the conductive flexible film 200.

The conductive flexible film 200 is formed of a soft material, and guarantees the movement of the liquid crystal panel 140 due to the change in a temperature, thereby preventing the liquid crystal panel 140 from being bent due to the change in an external environment.

Moreover, since the liquid crystal panel 140 is exposed as-is by removing a border, the liquid crystal panel 140 is vulnerable to static electricity. Static electricity generated in the liquid crystal panel 140 can be discharged to the ESD pad 200 through the conductive flexible film 200 and the adhesive member 210 including the conductive ball. Accordingly, the driving error of the liquid crystal panel 140 due to static electricity can be prevented.

In the LCD device according to the first and second embodiments of the present invention including the above-described elements, by realizing a borderless type that has no boundary portion between a border and a screen that displays images, the sense of beauty in the front surface of LCD device can be enhanced.

The LCD device according to the above-described embodiments of the present invention may be applied to notebook computers, monitors, televisions, mobile devices, etc.

In the above description, the liquid crystal panel 140 being applied as a display panel displaying images has been exemplified as one embodiment, but the present invention is not limited thereto. The liquid crystal panel 140 may be replaced by a display panel having a different type.

As another example of the present invention, the liquid crystal panel 140 may be replaced by a light emitting display panel that displays certain images according to the emission of a plurality of light emitting elements. In this way, when the LCD device according to the embodiments of the present invention includes the light emitting display panel, the LCD device does not include the backlight unit.

As described above, the LCD device of the present invention can prevent the damage of a liquid crystal panel.

The LCD device of the present invention prevents the flexure of a liquid crystal panel and light leakage, leading to the increase in display quality.

The LCD device of the present invention has the enhanced ability to remove static electricity.

In the LCD device of the present invention, by removing the case top and the set front cover, the thickness of the LCD device can be reduced.

In the LCD device of the present invention, by implementing a borderless screen, the sense of beauty in the front surface can be enhanced.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Liquid Crystal Display (LCD) device comprising:
 a liquid crystal panel including a top surface, a bottom surface opposite the top surface and substantially parallel to the top surface, and a side surface substantially perpendicular to the top surface and bottom surface;
 a guide panel comprising a side wall and a support part supporting the bottom surface of the liquid crystal panel;
 a side cover surrounding the side surface of the liquid crystal panel without overlapping the top surface of the liquid crystal panel and a side surface of the guide panel, the side cover including an inner side surface facing the side surface of the liquid crystal panel and the side surface of the guide panel, an outer side surface opposite to the inner side surface, and a hole formed through the inner side surface and the outer side surface of the side cover;

a conductive flexible film passing through the hole of the side cover;

an electrostatic discharge pad on the outer side surface of the side cover, wherein the liquid crystal panel inside the side cover and the electrostatic discharge pad on the outer side surface of the side cover are electrically connected to each other via the conductive flexible film passing through the hole of the side cover, and wherein the side cover further includes a to surface that is substantially perpendicular to the inner side surface and the outer side surface of the side cover, and wherein the to surface of the side cover is substantially level with the to surface of the liquid crystal panel.

2. The LCD device of claim 1, wherein the conductive flexible film comprises:

a disposing part between the support part of the guide panel and the liquid crystal panel, the disposing part adhered to the liquid crystal panel with a first conductive adhesive member interposed there between; and a fixing part bent outside the side cover, the fixing part adhered to the electrostatic discharge pad with a second conductive adhesive member interposed there between, wherein the conductive flexible film is bent at such an angle that the disposing part is substantially perpendicular to the fixing part.

3. The LCD device of claim 1, wherein the conductive flexible film is polyimide film or a polyethylene film, and has a thickness of 33 μm to 41 μm and a tensile strength of 4000 kgf/cm$^2$ to 5400 kgf/cm$^2$.

4. The LCD device of claim 2, wherein, the first conductive adhesive member comprises a first conductive ball and a first adhesive resin for adhering the liquid crystal panel to the disposing part, and the second conductive adhesive member comprises a second conductive ball and the first adhesive resin for adhering the fixing part to the electrostatic discharge pad.

5. The LCD device of claim 1, wherein the electrostatic discharge pad is coupled to the outer side surface of the side cover by a screw.

6. A Liquid Crystal Display (LCD) device comprising:

a liquid crystal panel;

a guide panel comprising a side wall and a support part supporting a bottom surface of the liquid crystal panel;

a side cover surrounding a side surface of the liquid crystal panel and a side surface of the guide panel, the side cover including an inner side surface facing the side surface of the liquid crystal panel and the side surface of the guide panel, an outer side surface opposite to the inner side surface, and a hole formed through the inner side surface and the outer side surface of the side cover;

a conductive flexible film passing through the hole of the side cover, the conductive flexible film comprising either a polyimide film or a polyethylene film and the conductive flexible film having a thickness of 33 μm to 41 μm and a tensile strength of 4000 kgf/cm$^2$ to 5400 kgf/cm$^2$;

an electrostatic discharge pad on the outer side surface of the side cover, wherein the liquid crystal panel inside the side cover and the electrostatic discharge pad on the outer side surface of the side cover are electrically connected to each other via the conductive flexible film passing through the hole of the side cover, and wherein the side cover further includes a to surface that is substantially perpendicular to the inner side surface and the outer side surface of the side cover, and wherein the to surface of the side cover is substantially level with the to surface of the liquid crystal panel.

* * * * *